United States Patent
Jeong et al.

(10) Patent No.: US 9,141,436 B2
(45) Date of Patent: Sep. 22, 2015

(54) APPARATUS AND METHOD FOR PARTITION SCHEDULING FOR A PROCESSOR WITH CORES

(71) Applicant: SAMSUNG ELECTRONICS CO., LTD., Suwon-si, Gyeonggi-do (KR)

(72) Inventors: Min Kyu Jeong, Suwon (KR); Chae Seok Im, Yongin (KR); Jae Don Lee, Yongin (KR); Seung Won Lee, Hwaseong (KR); Shi Hwa Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 303 days.

(21) Appl. No.: 13/627,610

(22) Filed: Sep. 26, 2012

(65) Prior Publication Data

US 2013/0081045 A1    Mar. 28, 2013

(30) Foreign Application Priority Data

Sep. 26, 2011    (KR) .................. 10-2011-0096815

(51) Int. Cl.
  *G06F 9/46*    (2006.01)
  *G06F 9/50*    (2006.01)
(52) U.S. Cl.
  CPC ............ *G06F 9/5083* (2013.01); *G06F 9/5038* (2013.01)

(58) Field of Classification Search
  None
  See application file for complete search history.

(56) References Cited

U.S. PATENT DOCUMENTS

| | | | |
|---|---|---|---|
| 8,578,386 B1* | 11/2013 | Bali et al. ...................... | 718/104 |
| 2003/0220951 A1* | 11/2003 | Muthulingam et al. ...... | 707/205 |
| 2007/0294689 A1* | 12/2007 | Garney ........................... | 718/1 |
| 2009/0328055 A1 | 12/2009 | Bose et al. | |
| 2010/0199280 A1* | 8/2010 | Vestal et al. .................. | 718/102 |
| 2011/0161627 A1 | 6/2011 | Song et al. | |
| 2012/0131309 A1* | 5/2012 | Johnson et al. ................. | 712/41 |

FOREIGN PATENT DOCUMENTS

| | | |
|---|---|---|
| JP | 4576452 | 8/2010 |
| KR | 10-2010-0026989 | 3/2010 |
| KR | 10-2010-0066458 | 6/2010 |
| KR | 10-2010-0070556 | 6/2010 |
| KR | 10-2011-0060835 | 6/2011 |

* cited by examiner

*Primary Examiner* — Kenneth Tang
(74) *Attorney, Agent, or Firm* — NSIP Law

(57) ABSTRACT

An apparatus for performing partition scheduling in a many-core environment. The apparatus may perform partition scheduling based on a priority and in this instance, may perform partition scheduling to minimize the number of idle cores. The apparatus may include a partition queue to manage a partition scheduling event; a partition scheduler including a core map to store hardware information of each of the plurality of cores; and a partition manager to perform partition scheduling with respect to the plurality of cores in response to the partition scheduling event, using the hardware information.

18 Claims, 4 Drawing Sheets

APPARATUS AND METHOD FOR PARTITION SCHEDULING FOR A PROCESSOR WITH CORES

CROSS-REFERENCE TO RELATED APPLICATIONS

This application claims the priority benefit of Korean Patent Application No. 10-2011-0096815, filed on Sep. 26, 2011, in the Korean Intellectual Property Office, the disclosure of which is incorporated herein by reference.

BACKGROUND

1. Field

Example embodiments of the following disclosure relate to a computing system and an operation method of the computing system, and more particularly, to a partition scheduling method for executing an application in a computing system including a manycore processor.

2. Description of the Related Art

Configuring a manycore system by considering performance and power in a variety of devices, such as, a smart phone, a television, a vehicle, and the like, for example, has assimilated into the mainstream market. With respect to apparatuses that constitute the manycore system, partition scheduling of cores for executing an application becomes an issue.

In a manycore processing environment, research has been conducted targeted to making computing performance effective so as to be required for a data-parallel and compute-intensive applications. As a part of such research, a method has been proposed that may efficiently schedule a plurality of applications, which simultaneously operates in a manycore system. As a representative example, partitioning may be provided.

Partitioning may guarantee quality of service (QoS) and stable drive of applications by grouping resources, for example, cores included in a manycore processing environment, and by providing an independent executing or processing space to each of the applications.

However, there is a need for an efficient solution with respect to partitioning associated with how many cores are to be assigned to which application, which core combination is to be assigned when the same number of cores is assigned, and the like.

SUMMARY

The foregoing and/or other aspects are achieved by providing an apparatus for performing partition scheduling for an application in a processor including a plurality of cores, the apparatus including a partition queue to manage a partition scheduling event, a partition scheduler including a core map to store hardware information of each of the plurality of cores, and a partition manager to perform partition scheduling with respect to the plurality of cores in response to the partition scheduling event, using the hardware information.

The hardware information may include identification information of an application that is currently assigned or has been previously assigned to each of the plurality of cores.

When an application associated with a first partition scheduling event is previously processed in a first core among the plurality of cores using the hardware information, the partition manager may perform partition scheduling by including the first core in the first partition scheduling event.

The hardware information may include node identification information within a bus connection topology of the plurality of cores.

The partition manager may perform partition scheduling to minimize the number of nodes associated with cores that are selected in response to a single partition scheduling event, using the hardware information.

The hardware information may include information associated with a physical structure in which each of the plurality of cores is connected to an internal apparatus or an external apparatus of the processor.

When a first core among the plurality of cores is relatively shortly connected to another apparatus that performs an application associated with a first partition scheduling event compared to other cores, the partition manager may perform partition scheduling by including the first core in the first partition scheduling event.

The partition manager may perform partition scheduling to minimize the number of idle cores among the plurality of cores.

The foregoing and/or other aspects are achieved by providing an operation method of a partition scheduling apparatus that performs partition scheduling for an application in a processor including a plurality of cores, the method including hierarchically managing a partition scheduling event based on a priority in a partition queue of the partition scheduling apparatus, selecting at least one partition based on hardware information of each of the plurality of cores that is stored in a core map included in a partition scheduler of the partition scheduling apparatus, and performing, by the partition manager of the partition scheduling apparatus using the hardware information, partition scheduling with respect to the plurality of cores in response to the partition scheduling event.

The foregoing and/or other aspects are achieved by providing a partition scheduling method for executing an application in a computing system including a manycore processor, the method including: performing partition scheduling in accordance with a partition scheduling event based on a priority of the application in a partition queue, wherein the performing of the partition scheduling comprises selecting at least one partition based on the priority and hardware information, and assigning the at least one partition to the application.

The hardware information may include hardware information of each core of a plurality of cores that is stored in a core map included in a partition scheduler of a partition scheduling apparatus.

The performing of the partition scheduling may minimize a number of idle cores.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
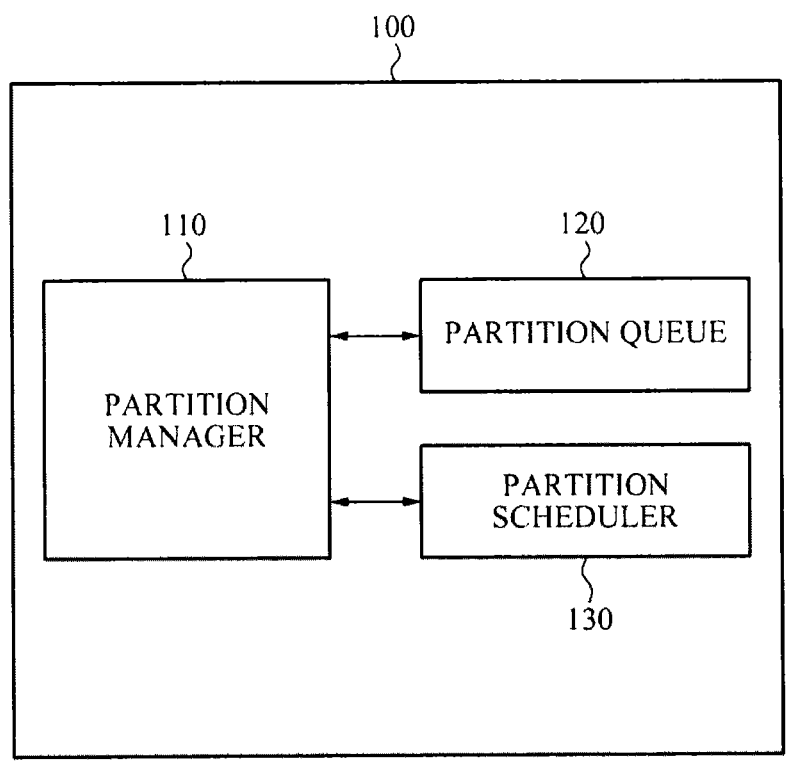
FIG. 1 illustrates a partition scheduling apparatus, according to an example embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a partition scheduling apparatus 100, according to an example embodiment.

According to an example embodiment, the partition scheduling apparatus 100 may receive information associated with a priority of an application to be assigned to a partition, including cores and a required minimum number of cores, and may assign, to the application, a partition that includes at least the required minimum number of cores.

A general priority based scheduling algorithm using a hierarchical bitmap may be employed for the above partition assignment or partition scheduling. More specifically, a partition may be selected based on a priority of an application and a core may be mapped with respect to the partition.

According to example embodiments, partition scheduling may be performed based on a hardware environment of a manycore system in the above scheduling, using hardware information. Therefore, utilization of resources may be maximized and overload occurring due to data transmission may be minimized.

According to example embodiments, efficient partitioning may be performed based on a priority of each of applications that are driven in a manycore system. Therefore, resources may be efficiently utilized in a real-time environment.

Using scheduling according to example embodiments, in the case of priority based partitioning of applications, exchange overload between data cores may be minimized or reduced based on a hardware environment of cores, and input and output delay may also be minimized or reduced. In addition, the number of idle cores may be minimized and locality may be enhanced for cache hit.

Hereinafter, a configuration and operation method of the partition scheduling apparatus 100 will be further described with reference to FIG. 1.

According to an example embodiment, a partition manager 110 is a logical or physical configuration corresponding to a portion of an operating system (OS). When a scheduling event with respect to an application occurs, the partition manager 110 is awakened to call a partition scheduler 130.

The scheduling event may include, for example, an event that an application generates or removes a partition, an event that the application suspends or resumes the partition, an event that the application changes a priority of the partition, an event that a time quantum runs out when a partition of the same priority is processed using a round robin scheme, and the like; however, the present disclosure is not limited thereto.

However, the above examples of the scheduling event are only a portion of embodiments, and thus, partition scheduling for application execution may include other examples without departing from the spirit of the embodiments.

The partition manager 110 may manage the overall partition scheduling process by managing a partition queue 120 and the partition scheduler 130. The partition manager 110 may be, for example, separate external dedicated hardware of a processor within a computing system, and may also be a physical part within a general processor.

When the partition manager 110 is awakened by detecting a scheduling event, the partition manager 110 may perform priority-based scheduling with respect to applications included in the partition queue 120. During the above process, a core map included in the partition scheduler 130 may be utilized.

As described above, partition scheduling according to an example embodiment may assign a partition to an application based on a priority with respect to an application that makes a request for partition scheduling. In this instance, with respect to cores to be included in a partition, partition assignment may be performed to maximize the efficiency based on system information of the cores, for example, a hardware environment.

System information of cores, for example, a partition identification (ID) of an assigned partition, node information, and a characteristic suitable for a predetermined hardware Internet protocol (IP) may be stored in the core map that is included in the partition scheduler 130.

The partition ID may be utilized to identify and distinguish the partition from other partitions. The node information may indicate cores that share the same bus, for example, whether the cores belong to the same node on a topology. The core map may also include a core that is suitable for a predetermined hardware IP, for example, information regarding whether communication is smooth and data input/output overhead is small, and the like.

An example of performing, by the partition manager 110 and the partition scheduler 130, partition scheduling in response to a partition assignment request of an application that is included in the partition queue 120 will be further described with reference to FIG. 2.

Figure 2:
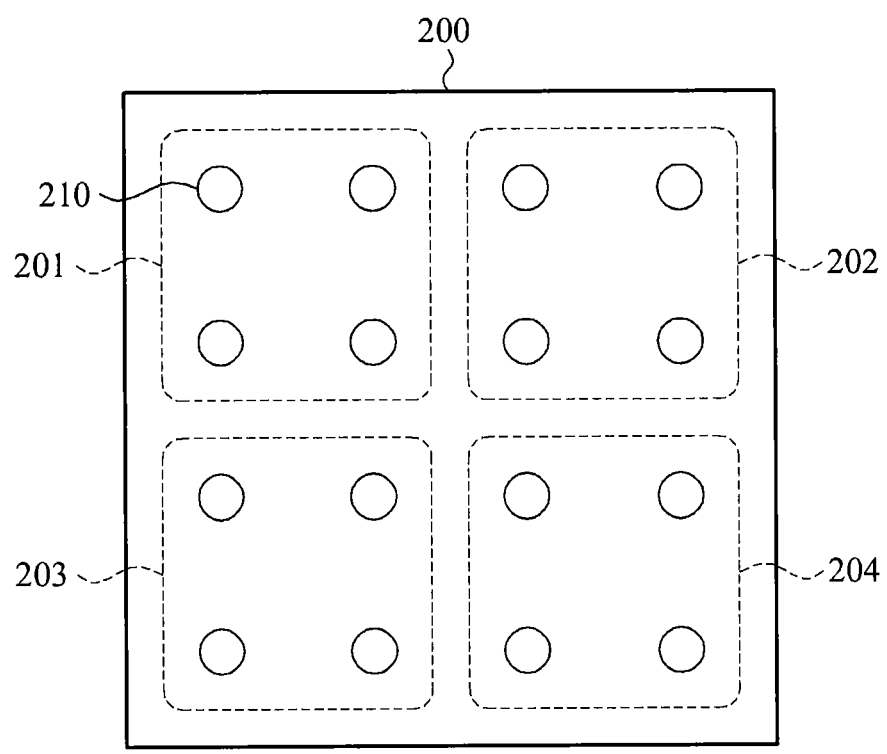
FIG. 2 illustrates a diagram describing a processor in a manycore environment, according to an example embodiment.

FIG. 2 illustrates a diagram to describe a processor 200 in a manycore environment, according to an example embodiment.

The processor 200 may be a manycore processor that includes, for example, 16 cores. Among cores, some cores may share an internal bus and cores sharing the same bus may be understood as cores that belong to the same node.

Referring to FIG. 2, cores 201 including a core 210 may be related to the same node that shares the same internal bus, as indicated by the dashed line including core 210, for example. Each of cores 202, cores 203, and cores 204 may be related to a node different from the node of the cores 201.

According to an example embodiment, in the case of a partition assignment corresponding to a single application, the partition assignment may be performed by grouping cores that belong to the same node, instead of performing the partition assignment by grouping cores that belong to different nodes.

Accordingly, the above hardware topology information may be stored in the core map within the partition scheduler 130 of the partition scheduling apparatus 100 of FIG. 1. The partition scheduler 130 and the partition manager 110 may perform scheduling by grouping cores that belong to the same node by referring to the core map. The partition scheduler 130 and the core map included therein will be further described with reference to FIG. 3.

Figure 3:
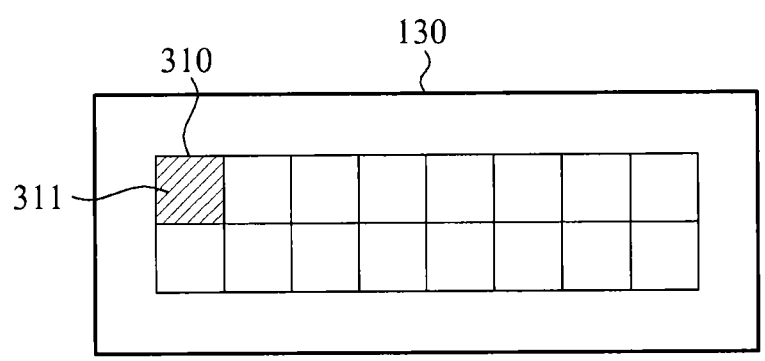
FIG. 3 illustrates a partition scheduler, according to an example embodiment.

FIG. 3 illustrates the partition scheduler 130, according to an example embodiment.

Referring to FIG. 3, a core map 310 may be included in the partition scheduler 130. A plurality of bit strings may be stored in the core map 310 by dividing the core map 310 into a plurality of areas. For example, hardware system information associated with the core 210 of FIG. 2, for example, a partition ID that is currently assigned or has been previously assigned to the core 210, information of a node to which the core 210 belongs, a suitable external hardware IP with which the core 210 appropriately interacts among external IPs, and the like, may be stored in an area 311.

Matching a core for each area is only a conceptual example and thus, any types of information storage that may store a hardware environment of each core may be employed for configuration of the core map 310. Accordingly, embodiments are not limited to the aforementioned embodiments.

Figure 4:
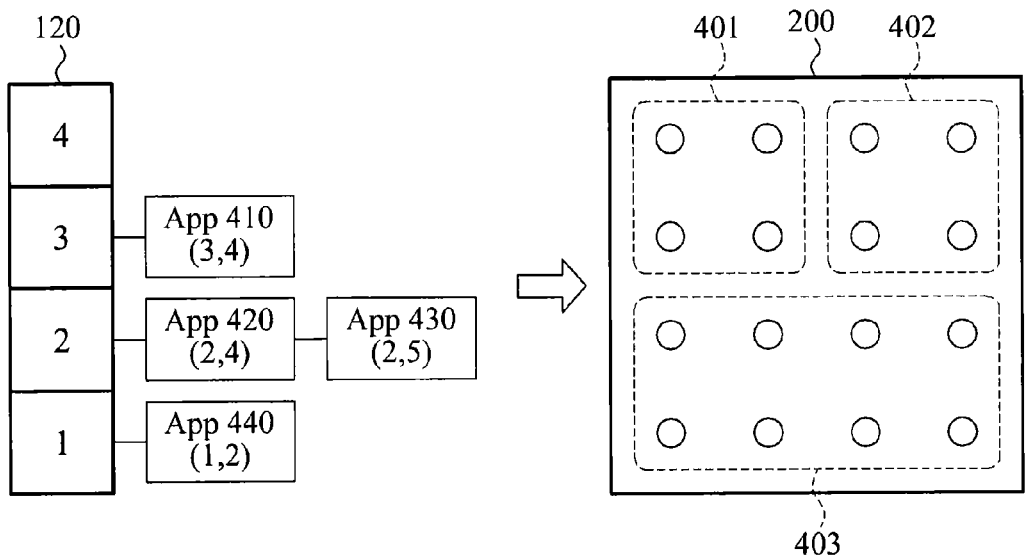
FIG. 4 through FIG. 6 illustrate diagrams describing a process of scheduling a partition with respect to applications included in a partition queue, according to an example embodiment.
Figure 5:
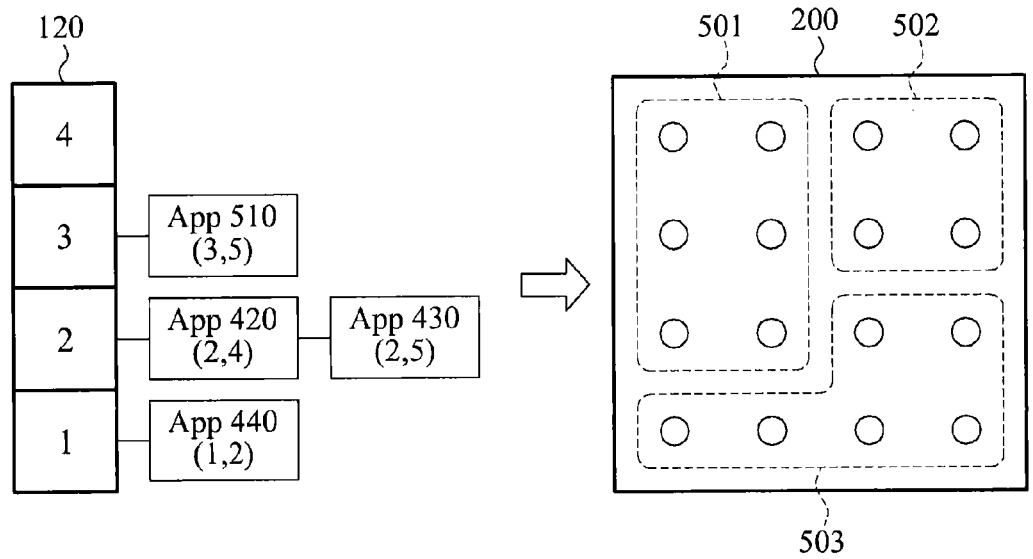
Figure 6:
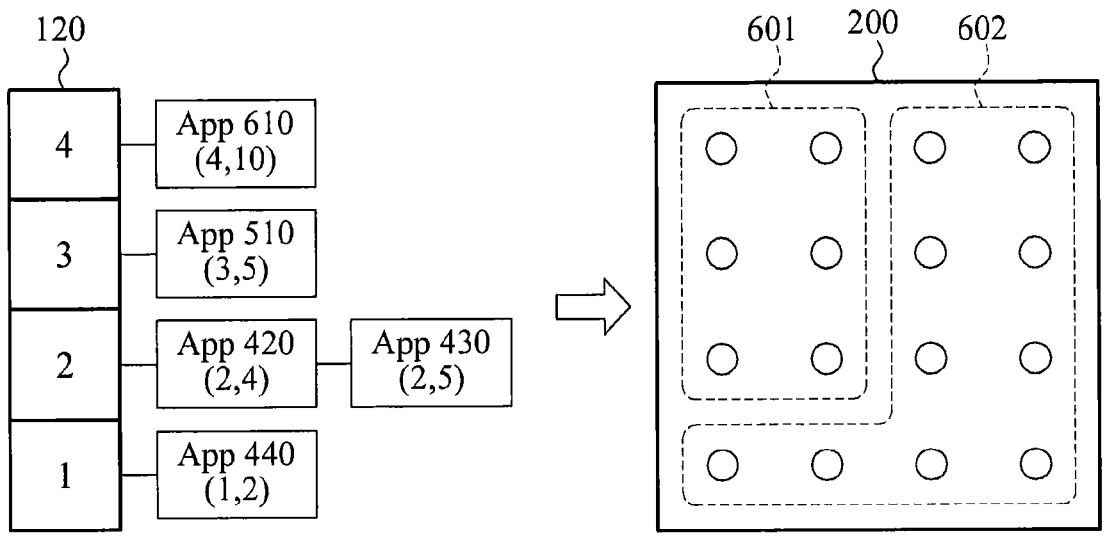

FIG. 4 through FIG. 6 illustrate diagrams to describe a process of scheduling a partition with respect to applications included in the partition queue 210, according to an example embodiment.

The partition queue 120 may have a hierarchical structure based on a priority. For example and ease of description, partition assignment requests of applications are en-queued to one of priority levels 1, 2, 3, and 4 in FIG. 4 through FIG. 6. In the following description, the priority level "4" denotes the highest priority and the priority level "1" denotes the lowest priority. The present disclosure is not limited to this example, and thus, other examples may be used.

As illustrated in FIG. 4, as an example, each of the partition assignment requests of the applications is hereinafter expressed as "App". As shown in FIG. 4, the value on the left in the parentheses positioned below "App" denotes a priority level and the value on the right of the parentheses denotes the minimum number of cores to be included in a partition that is to be assigned.

For example, an App 410 makes a request for a partition of which a priority level is "3" and that includes minimum four cores. Among Apps 410, 420, 430, and 440 that are currently en-queued in the partition queue 120, the App 410 has the highest priority.

In this example, the partition manager 110 may assign, to the App 410, a partition that includes the minimum four cores based on the priority.

According to an example embodiment, the partition manager 110 may assign, to a partition, the same number of cores as the minimum number of cores that are required to minimize the number of idle cores.

As described above, in the above partition assignment, the partition manager 110 may include, in the partition to be assigned, four cores that belong to the same node and thus, share the same internal bus. In the case of the App 410, cores 401 may be assigned to the partition.

Partition scheduling may be performed by assigning cores 402 to the App 420 having a subsequent or lower priority, i.e., a priority of "2", and by assigning cores 403 to the App 430 because App 430 includes a minimum of five cores.

When priority levels are different, the partition assignment may be performed with respect to an application having a relatively high priority. When the priority levels are the same, a variety of schemes may be applied based on a policy setting. For example, the variety of schemes may include a first in first output (FIFO) scheme of assigning a priority to a first en-queued partition request, a round robin scheme of, if the same priority, assigning a partition alternately by a predetermined time quantum, a FAIR scheme of assigning cores with respect to all of the partition requests by distributing remaining cores to be proportional to a required amount of all of the partitions having the same priority, and the like. The present disclosure is not limited to the above-described schemes.

The aforementioned description is only an example and thus, a policy of de-queuing an App in a queue may depend on a general computing theory.

Referring to FIG. 5, when partition scheduling is performed as illustrated in FIG. 4, and when Apps 510, 420, 430, and 440 are en-queued as illustrated in the partition queue 120 of FIG. 5, the partition manager 110 may refer to the previous partition scheduling result for current partition scheduling.

When cores 501 are assigned to the App 510, cores 502 that are the same as the previously assigned cores 402 of FIG. 4 may be assigned to the App 420. Accordingly, an operation rate may be enhanced by locality, such as, a cache hit, and the like. According to an example embodiment, to use the locality, the partition manager 110 may perform partition scheduling with respect to cores that have processed the same application, based on information included in the core map 310 within the partition scheduler 130.

In the case of executing a predetermined application, when a predetermined core is suitable for a hardware IP for processing the predetermined application, the partition manager 110 may perform partition scheduling using the corresponding predetermined core as well as previous partition ID information for locality.

Here, for example, the fact that the predetermined core is suitable for the hardware IP may indicate that the predetermined core has relatively small overload for transmitting and receiving data with the hardware IP compared to other cores, or may indicate that the predetermined core interacts with the hardware IP for application processing due to a variety of reasons such as sharing a portion of a memory, and the like. Additionally, the fact that a physical distance between a core and a hardware IP utilized by an application is close may also be included in the above concept.

Referring to FIG. 6, an App 610 is en-queued in the partition queue 120. In this case, as described above, cores 601 that have previously processed the App 510 may be scheduled for the App 510. Remaining cores 602 may be assigned to the App 610, which includes a minimum of 10 cores, as shown in FIG. 6.

When priority based scheduling is performed in an existing single core system, scheduling may be performed by selecting an application to be processed by a core. On the other hand, in a manycore system, the following core mapping operation may be required for a selected partition. According to example embodiments, it is possible to minimize the number of idle cores during the above process, and to efficiently utilize previously cached data. In addition, partition scheduling may be performed to provide the optimal performance for each application based on a bus connection structure or a connection with an external device.

Figure 7:
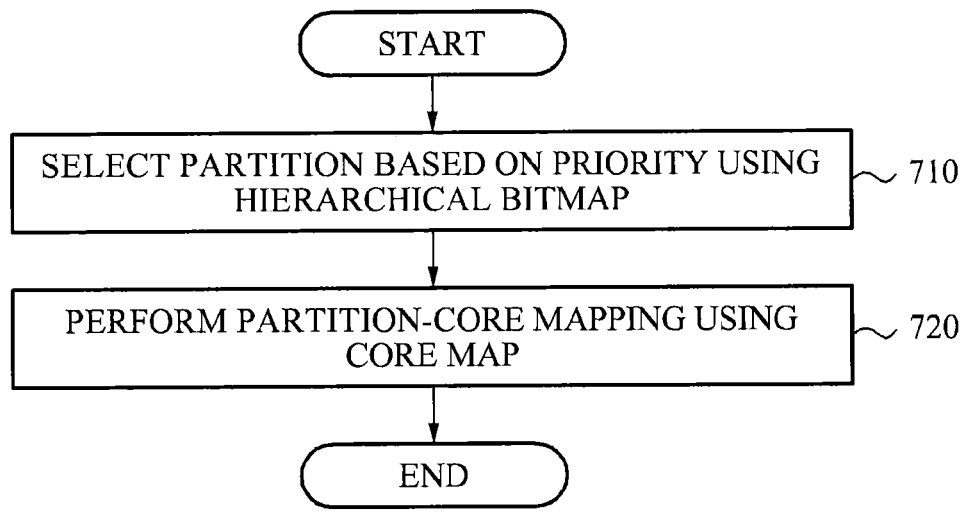
FIG. 7 illustrates a partition scheduling method, according to an example embodiment.

FIG. 7 illustrates a partition scheduling method, according to an example embodiment.

In operation 710, a partition may be selected based on a priority using a hierarchical bitmap. The above process corresponds to partition selection based on priority of each of applications that are en-queued in the partition queue 120. A description related thereto is described above with reference to FIG. 3 through FIG. 6, and thus, a further detailed description related thereto will be omitted here.

In operation 720, the partition manager 110 may perform partition scheduling with respect to the applications using the core map 310 included in the partition scheduler 130. Which cores are to be mapped during the above process is described above with reference to FIG. 4 through FIG. 6 and thus, a further detailed description related thereto will be omitted here.

In a general manycore system, particularly, in a system present in a real-time environment, partition scheduling may not be smoothly performed. According to the example embodiments, the partition scheduling apparatus 100 may smoothly perform priority based partition scheduling even in a manycore system and may also guarantee a smooth operation even in a real-time environment.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. Further, the one or more computer-readable recording medium may comprise a program for instructing a computer to perform or implement any of the above-described methods and/or units.

The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

Further, according to an aspect of the embodiments, any combinations of the described features, functions and/or operations can be provided.

Moreover, any apparatus or embodiment thereof discussed above may include at least one processor to execute at least one of the above-described units and methods.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for performing partition scheduling for an application in a processor comprising cores, the apparatus comprising:
    a partition queue configured to manage a partition scheduling event, the partition queue having a hierarchical structure configured to enqueue, based on a priority, partition assignment requests of applications;
    a partition scheduler comprising a core map configured to store data pertaining to a hardware environment of each core; and
    a partition manager processor configured to perform partition scheduling with respect to the cores, according to the partition scheduling event, and based on the stored data;
    wherein the stored data comprises identification information of an application assigned to each core of the plurality of cores; and
    wherein in response to previously processing an application associated with a first partition scheduling event in a first core among the cores, the partition manager processor is configured to perform the partition scheduling based on the stored data, by including the first core in the first partition scheduling event.

2. The apparatus of claim 1, wherein the stored data comprises node identification information, pertaining to a bus connection topology of the cores.

3. The apparatus of claim 2, wherein the partition manager processor is configured to perform partition scheduling, and to minimize a quantity of nodes associated with cores that are selected according to a single partition scheduling event, based on the stored data.

4. The apparatus of claim 1, wherein the stored data comprises information associated with a physical structure, wherein in the physical structure, each core is connected to an internal apparatus or an external apparatus of the processor.

5. The apparatus of claim 4, wherein when a first core among the cores is connected closer to another apparatus that is configured to perform an application associated with a first partition scheduling event, as compared to other cores, the partition manager processor is configured to perform partition scheduling by including the first core in the first partition scheduling event.

6. The apparatus of claim 1, wherein the partition manager processor is configured to perform the partition scheduling to minimize a quantity of idle cores among the cores.

7. A method of operating a partition scheduling apparatus that is configured to perform partition scheduling for an application in a processor comprising cores, the method comprising:
    managing a partition scheduling event, based on a priority, in a partition queue of the partition scheduling apparatus, the partition queue having a hierarchical structure configured to enqueue, based on a priority, partition assignment requests of applications;
    selecting at least one partition, based on data pertaining to a hardware environment of each core stored in a core map, wherein the core map is included in a partition scheduler of the partition scheduling apparatus; and partition scheduling, by a partition manager processor of the partition scheduling apparatus, with respect to the cores, according to the partition scheduling event, and based on the stored data;

wherein the stored data comprises identification information of an application assigned to each core of the plurality of cores; and wherein in response to previously processing an application associated with a first partition scheduling event in a first core among the cores, the partition manager processor is configured to perform the partition scheduling based on the stored data, by including the first core in the first partition scheduling event.

8. The method of claim 7, wherein the stored data comprises identification information of an application currently assigned, or previously assigned to each core.

9. The method of claim 8, wherein the partition scheduling comprises including a first core in a first partition scheduling event, when an application associated with the first partition scheduling event was previously processed in the first core among the cores, based on the stored data.

10. The method of claim 7, wherein the stored data comprises node identification information pertaining to a bus connection topology of the cores.

11. The method of claim 10, wherein the partition scheduling comprises minimizing a quantity of nodes associated with cores that are selected according to a single partition scheduling event, based on the stored data.

12. The method of claim 7, wherein the stored data comprises information associated with a physical structure, wherein in the physical structure, each of the cores is connected to an internal apparatus or an external apparatus of the processor.

13. The method of claim 12, wherein the partition scheduling comprises including the first core in the first partition scheduling event, when a first core among the cores is connected closer to another apparatus that is configured to perform an application associated with a first partition scheduling event, as compared to other cores.

14. The method of claim 7, wherein the partition scheduling comprises minimizing a quantity of idle cores among the cores.

15. A non-transitory computer-readable medium comprising: a program for instructing a computer to perform the method of claim 7.

16. A partition scheduling method for executing an application in a computing system including a processor with cores, the method comprising:

partition scheduling, in accordance with a partition scheduling event, based on a priority of the application in a partition queue, wherein the partition queue has a hierarchical structure configured to enqueue, based on a priority, partition assignment requests of applications, the partition scheduling comprising:

selecting at least one partition, based on the priority and stored data pertaining to a hardware environment, and assigning the at least one partition to the application;

wherein the stored data comprises identification information of an application assigned to each core of the plurality of cores; and wherein in response to previously processing an application associated with a first partition scheduling event in a first core among the cores, the partition manager processor is configured to perform the partition scheduling based on the stored data, by including the first core in the first partition scheduling event.

17. The partition scheduling method of claim 16, wherein the stored data comprises hardware information of each core, wherein the stored data is stored in a core map, and wherein the core map is included in a partition scheduler of a partition scheduling apparatus.

18. The partition scheduling method of claim 16, wherein the partition scheduling minimizes a quantity of idle cores.

* * * * *